United States Patent [19]

Shanklin

[11] 4,419,855
[45] Dec. 13, 1983

[54] LOW DRAG STATIC SEAMER

[76] Inventor: Frank G. Shanklin, Hemlock Park Dr., Groton, Mass. 01450

[21] Appl. No.: 266,080

[22] Filed: May 20, 1981

Related U.S. Application Data

[63] Continuation-in-part of Ser. No. 209,396, Nov. 24, 1980.

[51] Int. Cl.³ .................... B65B 9/06; B65B 51/26
[52] U.S. Cl. ............................. 53/450; 53/476; 53/550; 53/371; 53/378; 156/273.1; 53/547
[58] Field of Search ............... 53/442, 450, 463, 461, 53/545, 550, 547, 557, 371, 374, 378; 156/273.1, 274.4, 274.6, 275.1, 380.1, 380.8, 380.4, 151, 164, 272.2, 275, 290, 466, 537, 543

[56] References Cited

U.S. PATENT DOCUMENTS

| | | | |
|---|---|---|---|
| 2,152,077 | 3/1939 | Meston et al. | 156/273.1 X |
| 2,385,873 | 10/1945 | Melton | 156/273.1 X |
| 3,009,298 | 11/1961 | Gerlach et al. | 53/450 X |
| 3,274,302 | 9/1966 | Anderson et al. | 53/442 X |
| 3,392,504 | 7/1968 | Vates | 53/463 |
| 3,462,909 | 8/1969 | Anderson | 156/273.1 X |
| 3,473,288 | 10/1969 | Nakamura et al. | 53/550 X |
| 3,716,434 | 2/1973 | Cook et al. | 156/295 X |
| 3,784,711 | 1/1974 | Kane | 156/273.1 X |
| 4,025,375 | 5/1977 | Leasure | 53/450 X |

Primary Examiner—Horace M. Culver
Attorney, Agent, or Firm—Charles E. Pfund

[57] ABSTRACT

A static sealer for causing overlapping portions of film to adhere to each other preparatory to shrink-wrapping in an automatic wrapping machine comprising a grounded support having a planar surface and a charging head for generating an electrostatic field between the gounded support and charging head through which the overlapping portions of the film are moved rectilinearly to charge the latter oppositely, said grounded support being so designed as to reduce frictional resistance of the overlapping portions of the film to rectilinear tracking, said charging head being provided with discharge electrodes arranged with at least one electrode positioned medially of the path of travel of the seam and two other transversely-spaced electrodes downstream of the medially-positioned electrode.

27 Claims, 6 Drawing Figures 4,419,855

LOW DRAG STATIC SEAMER

This is a continuation-in-part application of Ser. No. 209,396, filed Nov. 24, 1980.

BACKGROUND OF INVENTION

Many high speed shrink wrapping machines are designed to form an overlapping seam at the bottom of the package which is being wrapped. The seam may be made by wrapping the film about the package in tubular form so that the opposite longitudinal edges overlap. In many cases, the overlapping portions need only be retained in overlapping relation long enough for the package to pass through a shrink tunnel; hence, a permanent seal is not required.

One way of making such an overlapping seam is to employ static seam-forming apparatus wherein the seam is made by placing the overlapping portions of the web or film in contact with each other between a static charging head and a grounded backing plate and generating a high voltage DC static charge between the head and the plate so that the overlapping portions of the film are oppositely charged and drawn together. A common problem encountered in the use of such apparatus is that the staticized film tends to stick to the backing plate, causing the film to mistrack or lose track due to the resistance of movement of the film over the backing plate. Another problem is the entrapment of bubbles of air between the overlapping portions of the film which weakens the seam and is unattractive in that it reduces the transparency of the seam. The foregoing problems derive particularly from the use of a multi-electrode static head.

It is the purpose of this invention to provide an apparatus and method for reducing and substantially eliminating the resistance to movement of the overlapping portions of the film as the seam is moved through the static sealer and to substantially eliminate the entrapment of air bubbles between the overlapping portions of the film.

SUMMARY OF INVENTION

The apparatus for statically adhering overlapping portions of film comprises a grounded support defining a flat planar surface across which the overlapping portions of the film are moved rectilinearly parallel to the plane of the planar surface and a charging head arranged to generate a static field between it and the support such as to charge the overlapping portions of the film oppositely as they are moved across the surface of the support characterized in that there is means on the support for reducing the surface contact of the overlapping portions of the film, hence, to reduce drag and further characterized in that there is means carried by the head for applying the charge to the overlapping portions of the film first medially thereof and thereafter marginally thereof to reduce the entrapment of bubbles. The means for reducing surface contact comprises longitudinally-spaced protrusions on the planar surface which hold the seam away from the planar surface at correspondingly-spaced intervals, which protrusions extend transversely of the direction of movement of the seam. Specifically, the protrusions are elongate rods disposed transversely of the direction of movement and are spaced longitudinally in spaced, parallel relation. The means for reducing entrapment of the bubbles comprises electrodes fixed to the charging head with one electrode positioned medially of the path of movement of the seam and at least two transversely-spaced electrodes, one at each side of the median electrode located downstream of the medially-positioned electrode. Optionally the electrodes may be employed arranged diagonally of the seam.

The method as carried out by the use of the aforesaid apparatus comprises on the one hand moving the overlapping portions of the sheet film to be adhered to each other through an electrostatic field generated between a charging head and a support while maintaining minimal contact between the support and the film and applying the field charge to the seam defined by the overlapping portions of the sheet film, first medially and thereafter marginally thereto.

The invention will now be described in greater detail with reference to the accompanying drawings, wherein:

FIG. 1 diagrammatically illustrates a part of an automatic wrapping machine showing a film wrapped about a container with its end portions overlapping;

Figure 2:
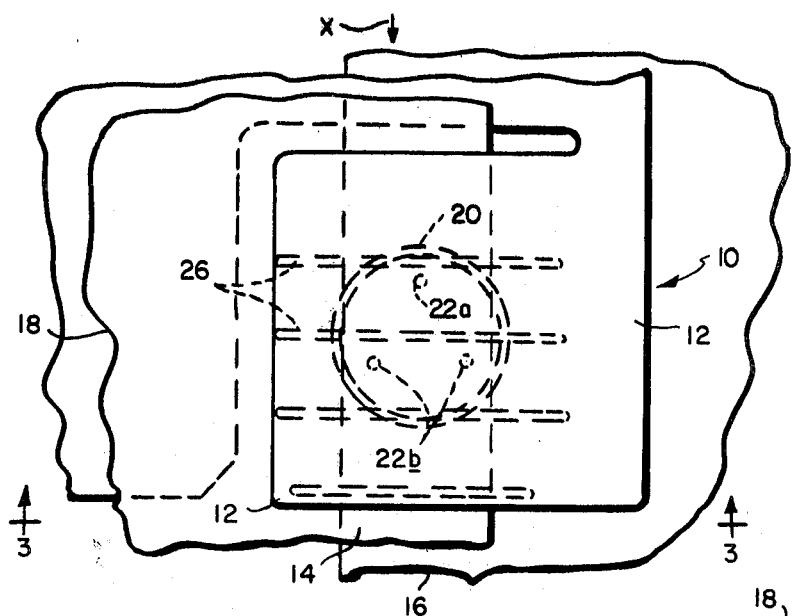
FIG. 2 is a fragmentary plan view of the folding head of an automatic wrapping machine provided with a static sealer for statically sealing the overlapping portions of a film wrapped about a container as shown in FIG. 1 showing the overlapping portions of the film situated between a grounded support and the charging head of the static sealer.
Figure 1:
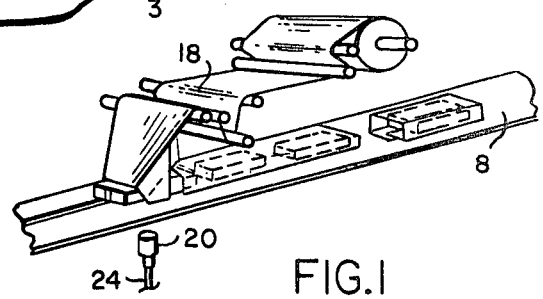

Referring to the drawings, FIG. 2, there is shown at 10 a fragmentary portion of the folding head of a static sealer which forms part of an automatic wrapping machine comprising in part a grounded plate 12 beneath which the overlapping portions 14 and 16 of a film 18 are moved rectilinearly in the direction of the arrow X by suitable tracking means not shown. The film 18 is wrapped about the product for shrinkwrapping in an automatic wrapping machine as diagrammatically shown in FIG. 1 so that the ends of the film overlap at the underside of the product. A vacuum conveyor 8 provides for conveying the wrapped product through the machine.

Figure 4:
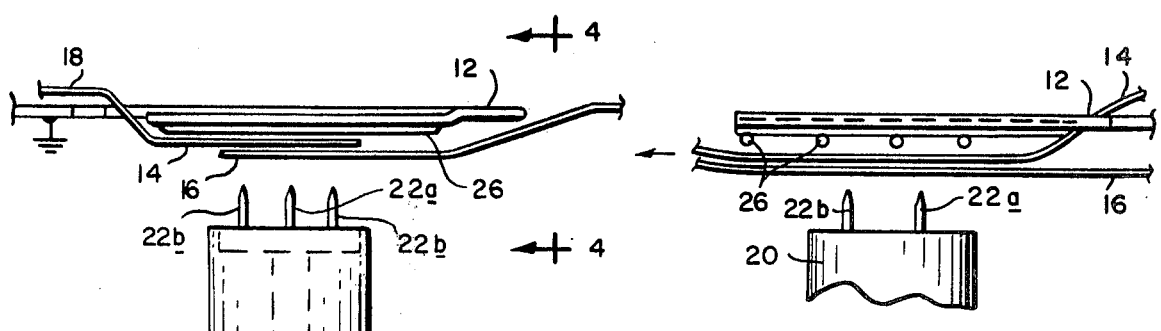
FIG. 4 is an elevation taken on the line 4—4 of FIG. 3.
Figures 3, 5:
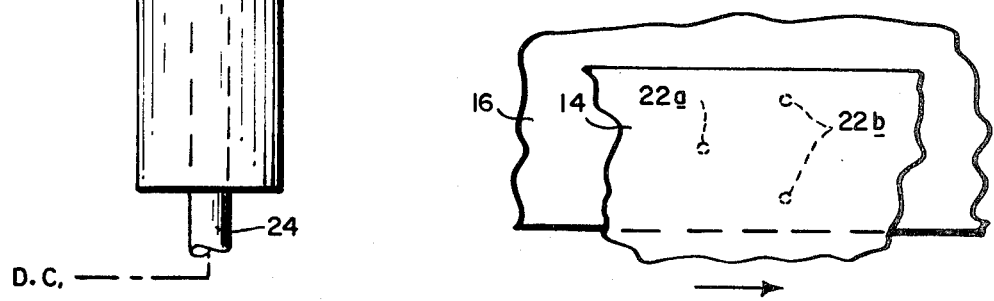
FIG. 3 is an elevation taken on the line 3—3 of FIG. 2.
FIG. 5 is a fragmentary plan view of a length of seam showing its overlapping portions and diagrammatically illustrating the preferred position of the static transmitting electrodes.

A charging head 20 comprising another part of the static sealer is supported below the grounded plate 12, FIGS. 3 and 4. The charging head is of circular right section and has protruding from its end face a plurality of electrodes in the form of spikes 22. The charging head is connected by a conductor 24 to a high voltage direct current static power supply DC.

The structure thus far described is conventional and, as has been previously pointed out, the staticized film tends to stick to the grounded plate, causing the film to mistrack or lose track as it passes over the forming head, thus breaking the seam and bubbles become entrapped between the overlapping portions of the film which produce a weak, unattractive seam.

The sticking (drag) is alleviated according to the invention by reducing the surface contact between the overlapping portions of the film and the grounded plate so that there is minimal contact between the overlapping portions of the film and the grounded plate, but without loss of electrostatic adherence between the overlapping portions of the film. This is achieved herein by forming and/or attaching to the lower side of the grounded plate 12 a plurality of longitudinally-spaced, transversely-extending ribs or rods 26, four such ribs 26 being shown in FIGS. 1 and 4. These ribs are spaced longitudinally at approximately ½ inch and may be comprised, for example, of 1/16 inch stainless steel wire welded to the surface of the support.

The spacers comprising the ribs or rods or wires, as may be, support the overlapping portions of the film away from the surface of the grounded plate at intervals corresponding to the spacing of the ribs or rods or wires, thus reducing the frictional resistance to movement of the film across the plate, that is, the drag, while at the same time maintaining a sufficient adherence between the overlapping portions to withstand tracking. The spacing of the overlapping portions of the film from the surface of the grounded plate allows air that may become trapped between the webs of the film to be ironed out by the ribs and, further, the static electricity seems to be concentrated by the ribs into a series of lines instead of being spread over the entire area, thereby making for a stronger seam. The reduction in the frictional resistance to movement of the overlapping portions of the film across the grounded plate promote better film tracking and also permit higher static voltage to be used which, in turn, results in better adherence. The entrapment of bubbles is further alleviated by arranging the electrodes on the head with respect to the direction of travel of the seam with a single electrode positioned medially of the path of movement of the seam and at least two transversely-spaced electrodes, one on each side of the medially-positioned electrode located downstream of the medially-positioned electrode. This arrangement of the electrodes is illustrated in FIG. 5 wherein one of the electrodes 22a is positioned medially of the edges of the seam as defined by the edges of the overlapping portions of the sheet material and two other electrodes 22b-22b are positioned in transversely-spaced relation at opposite sides of the center line of the seam and downstream of the medially-positioned electrode. By so positioning the electrode, the overlapping portions of the film are first drawn together medially of the edges, the effect of which is to squeeze the air between the overlapping portions of the film laterally away from the center of the seam and out through the as yet unattached edge portions so that when the edge portions are drawn together by the spaced electrodes downstream of the medially-positioned electrode, the air will have been eliminated and adhesion effected without inclusion of bubbles to thus prove a clear, attractive and strong seam. If the position of the electrodes were to be reversed, that is, the spaced electrodes placed upstream of the medially-positioned electrode, the marginal edges would be adhered first, thus trapping air between the edges in the form of bubbles and thus weakening the strength of the seam and its transparency.

Figure 6:
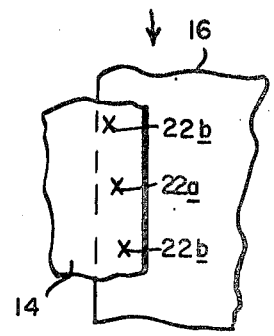
FIG. 6 is a fragmentary plan view of a length of seam showing its overlapping portions and diagrammatically illustrating an alternative position of the static transmitting electrodes.

Another arrangement of electrodes is shown in FIG. 6 wherein three electrodes are employed arranged diagonally of the seam with an electrode 22a positioned medially and electrodes 22b-22b positioned laterally, one upstream and the other downstream of the medially-positioned electrode 22a. While three electrodes are preferred, it is possible with this diagonal arrangement of electrodes to obtain a reasonably acceptable seal using only two of the electrodes, for example, 22b positioned upstream and 22a medially or 22a medially and 22b downstream. The important aspect of the positioning of the electrodes is to effect sealing without trapping bubbles.

While the apparatus as herein illustrated is designed especially for temporarily tacking the overlapping portions of the film preparatory to shrink-wrapping of the film about the article being covered, it is within the scope of this invention to employ this apparatus for forming temporary seals between overlapping portions of a film for any given purpose and so the grounded plate and the charging head illustrated herein can be employed in apparatus other than wrapping machines without departing from the spirit and intent of this invention.

It should be understood that the present disclosure is for the purpose of illustration only and includes all modifications or improvements which fall within the scope of the appended claims.

What is claimed is:

1. Apparatus for statically adhering overlapping portions of sheet film comprising a grounded support having a planar surface across which the overlapping portions of the film are tracked, means associated with the support for generating an electrostatic field through which the overlapping portions of the film pass as they are tracked across said planar surface so as to charge the overlapping portions oppositely and means for reducing the surface contact of the overlapping portions of the film with the planar surface.

2. In combination with an automatic wrapping machine wherein sheet film is wrapped about a product preparatory to shrink-wrapping, a folding head for folding the sheet film about the product and overlapping end portions thereof, means defining a support having a planar surface across which the overlapping portions of the film are tracked, means associated with the support for generating an electrostatic field through which the overlapping portions of the film are moved by tracking and means for reducing the surface contact between the overlapping portions of the film and the planar surface of the support.

3. Apparatus according to claim 1 wherein the means for generating the electrostatic field comprises a charging head positioned in confronting relation to the planar support connected to a source of high voltage direct current.

4. Apparatus according to claim 2 wherein the means for generating the electrostatic field comprises a charging head positioned in confronting relation to the planar support connected to a high voltage source of direct current.

5. Apparatus for statically adhering overlapping portions of sheet film comprising a grounded support defining a flat planar surface across which the overlapping portions of sheet film are moved rectilinearly parallel to the plane of the planar surface, a charging head arranged to generate a static field between it and the support so as to charge the overlapping portions of the sheet film oppositely and means on the planar surface of the support for holding the overlapping portions of the sheet film spaced from said planar surface to reduce the frictional resistance to rectilinear movement of the overlapping portions of the sheet film across the support.

6. Apparatus according to claim 5 wherein said means comprise longitudinally-spaced protrusions on the planar surface of the support which hold the overlapping portions of the sheet film spaced from the planar surface of the support.

7. Apparatus according to claim 6 wherein the means defining the protrusions extend transversely of the direction of movement of the overlapping portions of the sheet film.

8. Apparatus according to claim 6 wherein the means defining the protrusions are elongate rods disposed transversely of the direction of movement of the overlapping portions of the sheet film.

9. Apparatus according to claim 5 wherein the means for holding the overlapping portions of the sheet film are elongate bars positioned transversely of the direction of movement and spaced longitudinally of the direction of movement.

10. Apparatus according to claim 5 comprising a plurality of point electrodes on the charging head.

11. Apparatus for electrostatically adhering overlapping portions of sheet material comprising a grounded support and charging head arranged to define a path through which the overlapping portions of the sheet material can be moved, means for generating a field between the support and head, means for moving the overlapping portions of the sheet material along the path through said field, and means for first applying the charge in the field to a medial portion of the overlapping portions of the sheet material exclusively of the marginal portions and thereafter to the marginal portions.

12. Apparatus according to claim 11 wherein said last-named means comprises a single electrode positioned medially of the path of movement of the seam and transversely-spaced electrodes positioned at opposite sides of the medially-positioned electrode and downstream of the medially-positioned electrode.

13. Apparatus for electrostatically adhering overlapping portions of sheet material comprising a grounded support and a charging head arranged to define a path through which the overlapping portions of the sheet material can be moved, means connecting the charging head to a source of electrical output, means for moving the overlapping portions of the sheet material along said path between the charging head and support, electrodes projecting from the charging head into said path comprising a single electrode positioned medially of the path and transversely-spaced electrodes positioned at opposite sides of the medially-positioned electrode and forwardly of the medially-positioned electrode in the direction of movement of the seam.

14. Apparatus according to claim 13 comprising longitudinally-spaced means on the grounded support supporting the overlapping portions of the film sheet while traveling along said path in spaced, parallel relation to the grounded support.

15. Apparatus according to claim 14 wherein the longitudinally-spaced means for supporting the overlapping portions of the film while traveling along said path comprise longitudinally-spaced, parallel, transversely-extending ribs on the grounded support.

16. Apparatus for forming seams comprised of overlapping portions of sheet material comprising a grounded plate, a charging head positioned in spaced, parallel relation thereto, means for moving the overlapping portions of the sheet material between the plate and head and charge concentrating means on the head arranged medially and transversely of the path of travel with the transversely-positioned means at either side of the medially-positioned means downstream of the medially-positioned means in the direction of movement.

17. Apparatus for forming seams comprised of overlapping portions of sheet material comprising a grounded plate, a charging head positioned in spaced, parallel relation thereto, means for moving the overlapping portions of the sheet material between the plate and head and electrodes on the head arranged with one electrode medially of the path of travel of the overlapping portions and two transversely-spaced electrodes, one at either side of the medially-positioned electrode downstream of the medially-positioned electrode in the direction of movement.

18. A method of electrostatically adhering overlapping portions of sheet film wherein the edges of the overlapping portions define the width of the seam comprising generating an electrostatic field between a grounded support and a charging head, moving the overlapping portions of the sheet film through the field and applying the field charge medially of the seam exclusively of the edges and thereafter to the edges.

19. A method according to claim 18 comprising supporting the overlapping portions of the sheet film while moving through the electrostatic field at longitudinally-spaced intervals in spaced, parallel relation to the grounded support.

20. The method of forming a seam between overlapping portions of sheet film wherein the width of the seam is defined by the edges of the overlapping portions of the film comprising moving the overlapping portions through an electrostatic field and, while moving through said electrostatic field with the aid of selective concentration of the field charge, adhering a portion of the area of the overlapping portions intermediate the edge portions and thereafter adhering the overlapping portions marginally of the intermediate portion.

21. The method of forming a seam between overlapping portions of sheet material wherein the width of the seam is defined by the edges of the overlapping portions of the film comprising moving the overlapping portions through an electrostatic field and, while moving the overlapping portions through said electrostatic field, applying the charge in the field to a medial portion of the approaching overlapping portions of the embryonic seam exclusively of the marginal portions and thereafter to the marginal portions.

22. The method of forming a seam between overlapping portions of sheet film wherein the width of the seam is defined by the edges of the overlapping portions of the film comprising moving the overlapping portions of the seam through an electrostatic field and, while moving the overlapping portions through said electrostatic field, concentrating the field charge medially of the seam exclusively of the marginal edges and thereafter on the marginal edges with the aid of charge transmitting means positioned medially of the path of travel of the seam, and a transversely-spaced charge transmitting means at either side of the medial charge transmitting means and spaced downstream of the medially-positioned transmitting means.

23. The method of forming a seam between overlapping portions of sheet film wherein the width of the seam is defined by the edges of the overlapping portions of the film comprising moving the overlapping portions of the embryonic seam through an electrostatic field and while traveling through the field, concentrating the field charge medially of the seam exclusively of the marginal edges and thereafter on the marginal edges with the aid of charged transmitting means positioned medially of the path of travel of the seam, and a transversely-spaced charge transmitting means at either side of the medial charge transmitting means and spaced downstream of the medially-positioned transmitting means.

24. Apparatus according to claim 11 wherein said last-named means comprises an electrode positioned medially of the path of movement of the seam and an electrode positioned laterally thereof and upstream of the medially-positioned electrode.

25. Apparatus according to claim 11 wherein said last-named means comprises an electrode positioned medially of the path of movement of the seam and an electrode positioned laterally thereof and downstream of the medially-positioned electrode.

26. Apparatus according to claim 11 wherein said last-named means comprises a plurality of electrodes positioned diagonally of the seam with one such electrode positioned medially of the seam, one positioned laterally thereof upstream of the medially-positioned electrode and the other positioned laterally and downstream of the medially-positioned electrode.

27. Apparatus for statically adhering overlapping portions of sheet film comprising a grounded support having a planar surface across which the overlapping portions of the film are tracked, means associated with the support for generating an electrostatic field through the overlapping portions of the film as they are tracked across said planar surface so as to charge the overlapping portions oppositely and means for reducing the surface contact of the overlapping portions of the film with the planar surface characterized in that the last-named means not only reduces the surface contact of the overlapping portions of the film with the planar surface, but, in addition, irons the trapped air out from between the overlapping portions and concentrates the static electricity in a series of lines rather than over the entire area, thereby making a stronger seam.

* * * * *